United States Patent [19]
Atkinson

[11] Patent Number: 5,429,723
[45] Date of Patent: Jul. 4, 1995

[54] HYPOBROMINATION OF WATER

[75] Inventor: Alan Atkinson, Reading, United Kingdom

[73] Assignee: Cogent Limited, London, Great Britain

[21] Appl. No.: 265,699

[22] Filed: Jun. 24, 1994

Related U.S. Application Data

[63] Continuation of Ser. No. 978,191, Nov. 18, 1992, abandoned, which is a continuation of Ser. No. 762,063, Sep. 18, 1991, abandoned, which is a continuation of Ser. No. 473,973, Apr. 20, 1990, abandoned.

[30] Foreign Application Priority Data

| Oct. 27, 1987 | [GB] | United Kingdom | 8725164 |
| Dec. 15, 1987 | [GB] | United Kingdom | 8729249 |
| Jan. 26, 1988 | [GB] | United Kingdom | 8801713 |
| Jun. 13, 1988 | [GB] | United Kingdom | 8813954 |

[51] Int. Cl.$^6$ .................... C02F 1/461; C02F 1/467
[52] U.S. Cl. .................... 204/103; 204/101; 204/149; 204/229; 204/275
[58] Field of Search ............ 204/103, 101, 275, 229, 204/149

[56] References Cited

U.S. PATENT DOCUMENTS

| 1,079,377 | 11/1913 | Swinburne | 204/149 |
| 1,200,165 | 10/1916 | Burgess | 204/149 |
| 2,882,210 | 4/1959 | Jenks | 204/151 |
| 3,210,262 | 10/1965 | Klein | 204/275 |
| 3,305,472 | 2/1967 | Oldershaw et al. | 204/268 |
| 3,334,035 | 8/1967 | Dews et al. | 204/149 |
| 3,766,045 | 10/1973 | Itakura et al. | 204/149 |
| 4,118,307 | 10/1978 | LaBarre | 204/268 |
| 4,202,738 | 5/1980 | Stillmann | 204/95 |
| 4,488,945 | 12/1984 | Spaziante | 204/128 |
| 4,519,889 | 5/1985 | Pellegri et al. | 204/275 |

FOREIGN PATENT DOCUMENTS

| 0133920 | 3/1985 | European Pat. Off. |
| 0243846 | 11/1987 | European Pat. Off. |
| 1278591 | 6/1972 | United Kingdom |
| 1294357 | 10/1972 | United Kingdom |
| 1435503 | 5/1976 | United Kingdom |
| 2048942 | 12/1980 | United Kingdom |

Primary Examiner—John Niebling
Assistant Examiner—Arun S. Phasge
Attorney, Agent, or Firm—Jan P. Brunelle; Walter H. Dreger

[57] ABSTRACT

HOBr solution for biocidal treatment is produced by electrolysis of mixed chloride/bromide solution. The chloride: bromide molar ratio is greater than 4:1. The molar ratio and rate and period of electrolysis can be selected so as to result in high yield of HOBr, preferably over 90% of theory, and little or no residual HOCl. The process can suitably be carried out by recirculating the mixed halide electrolyte through an electrolytic cell for a time appropriate to achieve the desired result, and then discharging the solution to a receiving system.

13 Claims, 5 Drawing Sheets

HYPOBROMINATION OF WATER

This is a continuation of application Ser. No. 07/978,191 filed Nov. 18, 1992, now abandoned, of application Ser. No. 07/762,063 filed Sep. 18, 1991, now abandoned, which is a continuation of application Ser. No. 07/473,973 filed Apr. 20 1990, now abandoned.

This invention relates to the production of biocidally effective solutions of hypobromous acid, involving the use of an electrolytic cell, typically of the kind normally used for generating hypochlorous acid by the electrolysis of brine.

Hypochlorous acid (HOCl) has long been used as a biocide, particularly in treating water, but increasing attention is being given to the alternative use of hypobromous acid (HOBr), because it can be more effective than HOCl and is less of an environmental pollutant.

It is known that sodium bromide when added to an excess of sodium hypochlorite solution is rapidly and completely converted into HOBr. Prior art proposals, therefore, have sought to couple this efficient reaction with the relatively inefficient but low cost generation of HOCl so as to produce HOBr. One way of approaching this is to store sodium hypochlorite and sodium bromide solutions in separate reservoirs, and to meter these solutions into the water to be treated, so that the hypochlorite is in excess and effects a complete conversion of bromide into HOBr. A problem with this approach, however, is the need to store sodium hypochlorite, which is chemically unstable. It thus has to be monitored for quality, or else rapidly used or periodically replaced, if one is to ensure that there is always an excess hypochlorite over bromide, without using undue amounts of hypochlorite.

Other approaches to bromine treatment of water include the use of halogenated organic compounds such as bromochloro-5,5-dimethylhydantoin, which are hydrolysed to release hypobromous and hypochlorous acid into solution. Such compounds are, however, normally expensive.

The present application is based on work involving the generation of HOBr by circulating through an electrolytic cell a mixture of chloride and bromide ions, so as to produce HOBr. However, bromides are considerably more expensive than chlorides, and so it is important to make the most efficient use of the bromide; more specifically to ensure its virtually complete conversion into HOBr with as little as possible by-product formed. It may also be important in many situations to minimise the production of HOCl to avoid unnecessary environmental pollution.

We have found that this can be achieved by employing a combination of factors, but most important of which are the ratio of chloride to bromide in the solution undergoing electrolysis and the rate and period of electrolysis. During the course of electrolysis, the bromide may be electrolysed directly to HOBr or converted indirectly by reaction with the HOCl produced by the electrolysis of chloride, the HOCl being thereby converted back to chloride. Thus, the presence of chloride, increases the conductivity of the solution, and should enable at least initially an efficient electrolytic conversion of bromide to HOBr, but in practice it has been found that the conversion often falls far short of its theoretical maximum yield.

U.S. Pat. No. 2,882,210 describes inter alia the simultaneous electrolysis of chloride and bromide solutions for treatment of swimming pool water, but contemplates very high chloride:bromide ratios (about 100:1) in a solution making a single pass through a diaphragm type electrolytic cell. EP 243846 discloses the electrolysis of mixed chloride/bromide solutions in a recirculating system, but contemplates molar ratios of chloride to bromide preferably in the range of 1:4 to 4:1. In neither disclosure is any attempt made to address the efficient utilisation of bromide, still less the possibility of minimising the production of HOCl relative to HOBr. The research carried out by the present inventor has led to surprising conclusions, not at all predicted by these prior art disclosures.

According to one aspect of the present invention there is provided a process for producing hypobromous acid by electrolysing a solution containing both chloride and bromide ions, characterised in that:

(i) the molar ratio of chloride:bromide ions initially is greater than 4:1; and (ii) said molar ratio, the rate of electrolysis and the period of electrolysis are selected so as to result in a yield of hypobromous acid of at least 75% of the theoretical yield, based on the initial concentration of bromide ion.

The yield of HOBr is preferably at least 80%, most preferably at least 90% of said theoretical yield. The electrolysis is preferably terminated before a substantial amount of HOCl is produced; for example before it exceeds 20% of the molar concentration of HOBr; preferably within 10%, most preferably within 5%.

The process may involve recirculating a volume of electrolyte through an electrolytic cell for an appropriate period. It may however alternatively involve passing the electrolyte once through an electrolytic cell or bank of cells, the rate and period of electrolysis being determined by the electric current density and the rate of flow.

The invention also includes apparatus for producing HOBr by the foregoing process, the apparatus comprising electrolytic cell, fluid transport means for passing electrolyte through the cell, either in a single pass or in a recirculating manner, and control means for determining the rate and period of electrolysis.

The apparatus suitably comprises a reservoir having an inlet for introducing the chloride/bromide solution, an outlet leading to the electrolytic cell inlet, a conduit returning treated solution from the cell to the reservoir, and a pump for maintaining circulation. The reservoir may be provided with a discharge outlet, but preferably the discharge is from a point in the circuit downstream from the pump, whereby the HOBr solution is pumped from the reservoir to the water to be treated.

The invention further comprises a method of biocidally treating water, which involves preparing a solution of HOBr by the process hereof and discharging the solution into water to be treated, and repeating the procedure as often as required to maintain an adequate level of biocidal treatment of the water. This may involve operating the procedure cyclically at predetermined intervals, or periodically on demand in response to a signal indicating that treatment is required.

In the recirculating mode, the system is preferably operated batchwise, with a batch of chloride/bromide solution being circulated through the cell for an appropriate period, and then discharged into the receiving system requiring it. The receiving system can for example be a supply of domestic water or industrial water.

In certain areas of electrolytic water treatment, seawater is used as the source of chloride solution to be electrolysed. One example of this is in power stations where seawater is used in large quantities as a coolant in order to prevent the build-up of algal growth and other marine biofoulants on the cooling surfaces, the seawater is electrolysed to produce in it sufficient HOCl to inhibit or prevent the growth of biofilms in the heat exchangers and general circuitry. Another situation is in the area of oil and gas extraction, where the oil and gas extracted are normally replaced with seawater. Again, it is general practice to subject the seawater to electrolysis to produce a sufficient amount of HOCl in it to inhibit or prevent the growth of marine organisms in the pipework and in the subterranean cavities from which the oil or gas is extracted. The present invention is applicable to the improvement of such processes involving the electrolysis of seawater; the improvement comprising the addition of bromide ions to the seawater according to the foregoing principles.

The system can operate by passing all the bromided seawater through the electrolytic cell, in a single pass or in a recirculating mode; or instead, a portion of the seawater is mixed with bromide ions and circulated electrolysed to produce a relatively high concentration of HOBr, and that batch is then discharged into the main body of seawater to produce an acceptable overall level of biocide. By way of example, this may be achieved by circulating through the electrolytic cell a portion of the seawater (e.g. 1%–20%) and adding to it extra chloride plus bromide salts. The increased solution conductivity would improve the electrolytic production rate, and the high salt (oxidised) concentration would greatly improve the kinetics of the chemical oxidation step.

The recirculating approach could also reduce the physical size of electrolytic cell needed, since owing to the relative dissociation constants of HOCl and HOBr and the pH of the seawater, smaller quantities of HOBr would be needed relative to the HOCl production. At pH 8.5, HOBr undissociated is 60% while HOCl undissociated is only 9%. It is the undissociated species that reportedly has the greater biocidal action.

Unless the context indicates otherwise, as used herein HOCl and HOBr, and the expression hypochlorous acid and hypobromous acid, will be understood to include hypochlorite and hypobromite ions insofar as they exist in equilibrium with the free acids, and vice versa.

The invention will be further described and explained with rerefence to the following experimental work.

Experimental

The experiments were carried out using a Cogen EC 400 Electrochlorinator (Cogen Environmental Ltd., Milton Keynes, England) electrolysis cell. The applied current was 35 amps, and a fixed volume of electrolyte was recirculated through the cell. At intervals the electrolyte would be sampled and assayed.

Figure 1:
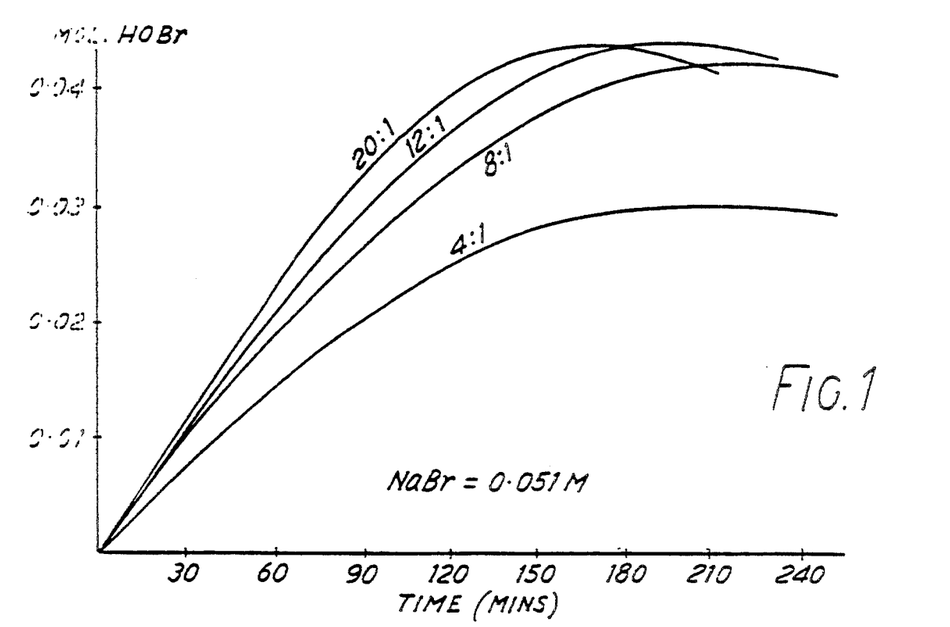
FIG. 1 shows a graph of HOBr production with time, at an electrolysis rate of 84 coulombs/liter/min., given a constant starting bromide concentration of 5.25 g/l (0.051M) NaBr, at different chloride:bromide ratios, 4:1, 8:1, 12:1 and 20:1.

Referring to the experiment shown in FIG. 1; 25 liter volumes of electrolyte were recirculated through the cell giving a rate of electrolysis of 84 coulombs/liter/min. With the 4:1 ratio the yield of HOBP peaked at about 0.03M and there was still bromide ion left in solution. With the 8:1 ratio, all the bromide had been oxidised, and the peak of HOBr was 0.042M after about 220 minutes. With the 12:1 ratio the peak was somewhat higher at about 0.044M after about 195 minutes; while the 20:1 ratio yielded almost the same amount of HOBr after about 105 minutes, again, with all the bromide oxidised.

It would appear, therefore, that under these conditions a chloride:bromide ratio of appreciably greater than 4:1 is needed to ensure complete oxidation of the bromide by the time the peak HOBr level is reached; and something over 8:1 is needed to optimize the yield of HOBr. Higher ratios may reduce the time to achieve the maximum yield, probably because the chloride is more rapidly electrolysed, so that the higher concentration of chloride leads to a more rapid production of HOBr via HOCl. However, since HOBr is the primary biocidal product of interest, too large an excess of chloride is likely to be undesirable, as it will have been partly converted to the less effective, and rather polluting, hypochlorite, and most of the rest will remain as salt in solution, resulting in an unnecessary consumption of power and raw material and greater risk of corrosion problems in the industrial circuit into which it will be discharged. It will also be noted that the yield of HOBr in FIG. 1 is about 58% of the theoretical yield for the 4:1 ratio, about 80% for the 8:1 ratio, and about 86% for the 12:1and 20:1 ratios.

The difference between the 0.044M maximum yield of HOBr and the 0.051M theoretical maximum will be accounted for by undesired side reactions. These are likely to increase, the longer the electrolysis period continues. This is illustrated in FIGS. 2 and 3, where a constant 12:1 chloride:bromide ratio (0.537M NaCl and 0.0448M NaBP) was electrolysed.

The rate of electrolysis was varied by circulating respectively 10, 25 and 50 liters of this solution through the electrolysis cell. Thus, the 10 liter batch was electrolysed at the rate of 210 coulombs/liter/minute, the 25 liter batch at 84 coulombs/liter/minute, and the liter batch at 42 coulombs/liter/minute. As shown in FIG. 2, this is reflected in the initial slopes of the three curves A, B and C, respectively, and also the different times taken to reach peak levels of HOBr. More significantly, it will be noted that the highest rate of electrolysis (A) produced a straight rise of HOBr production up to a sharp maximum of about 0.043M after about 60 minutes, which is significantly higher than the peaks reached at the slower electrolysis rates after much longer electrolysis periods (B and C). At 0.043M, the yield is also close (96%) to the theoretical maximum of 0.0448M.

Figure 3:
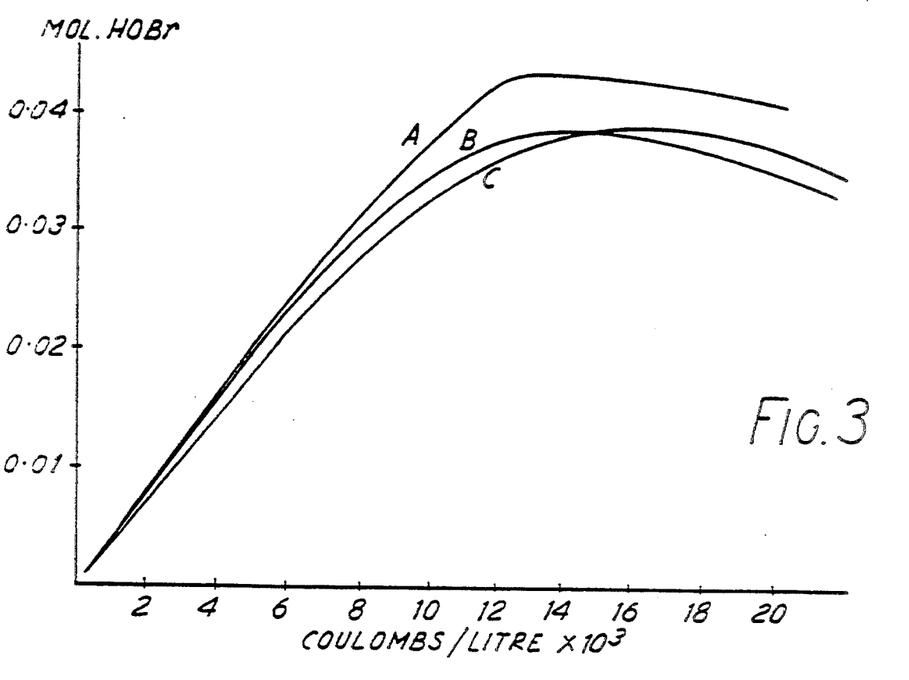

FIG. 3 shows the same results presented in terms of the production of HOBr against the total charge consumed. It will be seen that the charge required to reach the peak is of the same order in all cases, in the range 13,000–18,000 coulombs/liter, but within that range the faster the rate the less charge was required.

Figure 2:
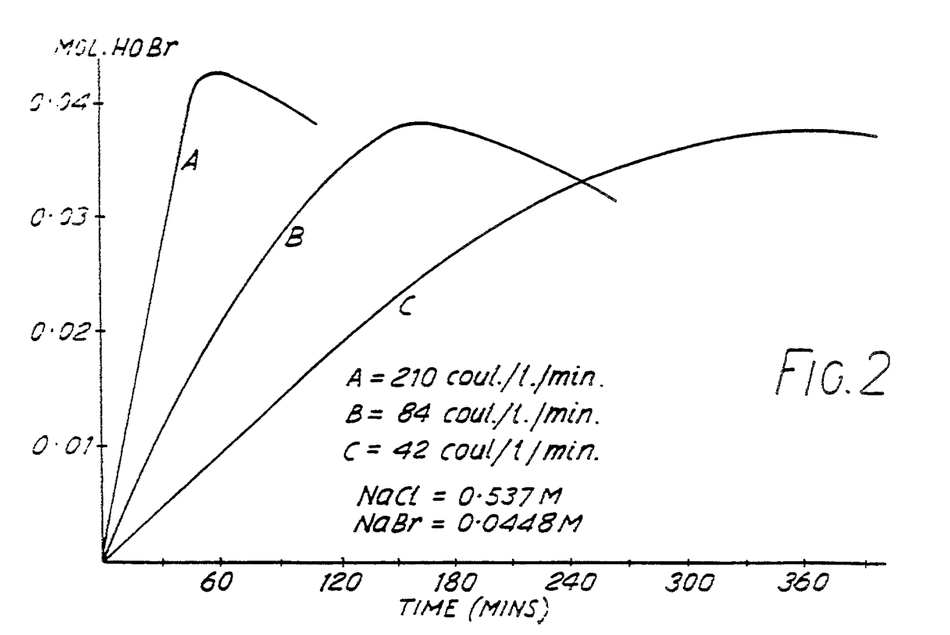
FIGS. 2 and 3 show the yield of HOBr from a 12:1. chloride: bromide solution at different rates of electrolysis; 42, 84 and 210 coulombs/liter/min.

It should also be noted that the NaCl concentration in the FIGS. 2 and 3 experiment is typical of that commonly found in seawater, so that the graph suggests that an efficient hypobromination of seawater can be achieved by adding about 0.045M of NaBr, giving a chloride:bromide ratio of about 12:1, and electrolysing at a rate of about 200 coulombs/liter/minute or greater. The HOBr level peaks at about 0.4% by weight.

Figure 4:
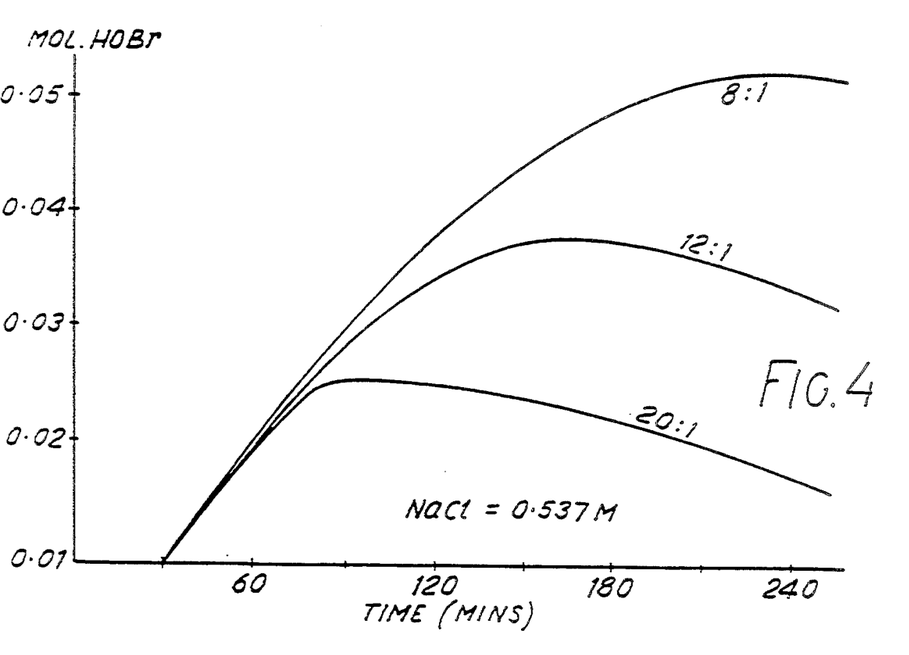
FIG. 4 shows the yield of HOBr from electrolysis of different chloride:bromide ratio solutions with a constant (0.537M) chloride starting concentration, at an electrolysis rate of 84 coulombs/liter/min.
Figure 5:
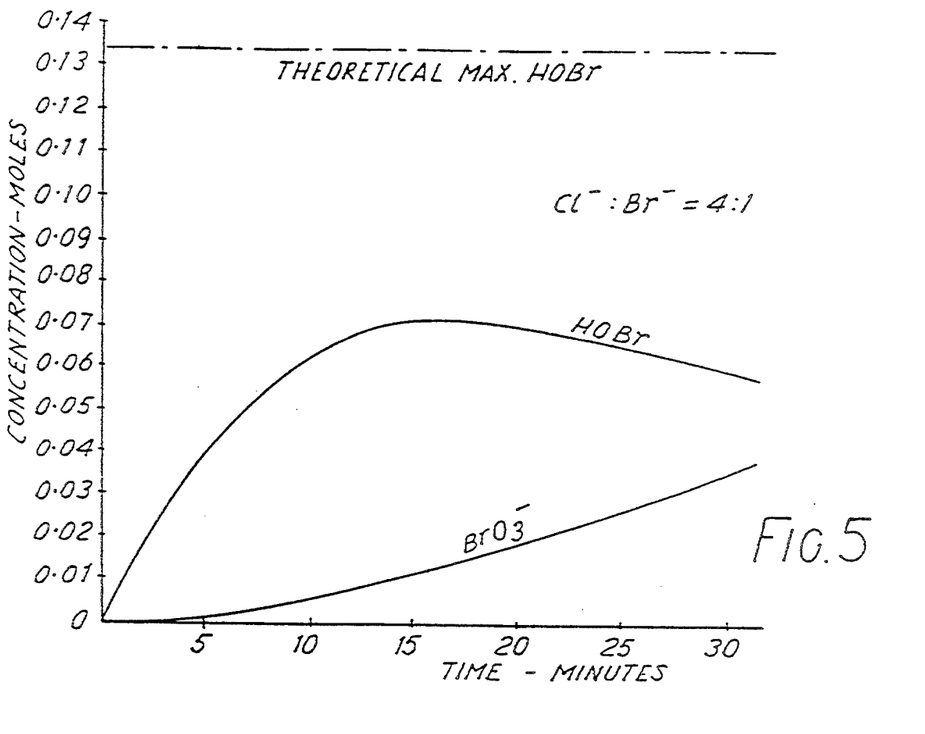
FIGS. 5 to 8 show the production of HOBr, HOCl and bromate with respect to time, at an electrolysis rate of 2100 coulombs/liter/min., with a constant (0.53M) chloride starting concentration, and chloride: bromide ratios of 4:1, 6:1, 8:1 and 12:1, respectively.
Figure 6:
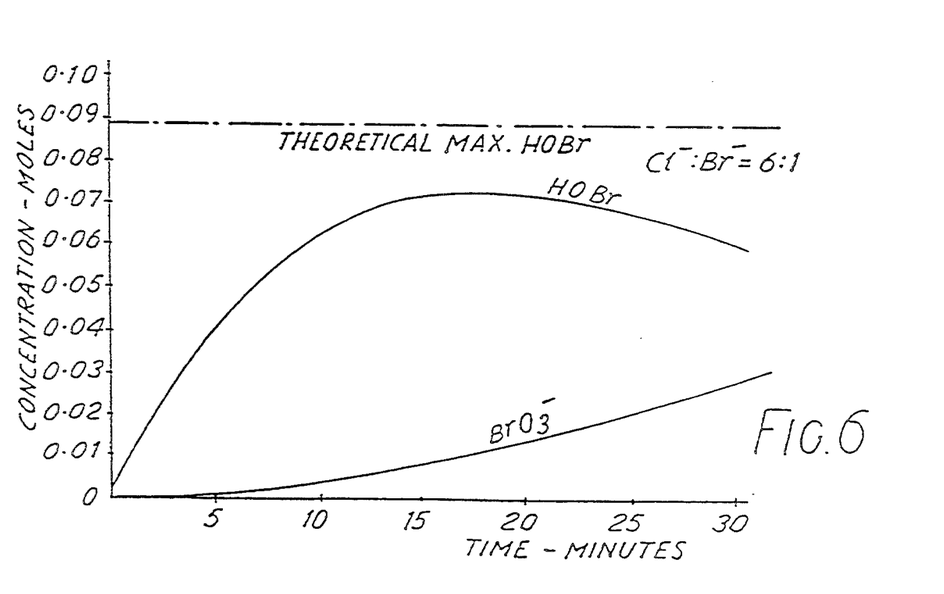

To investigate this further, FIG. 4 shows a graph of different chloride:bromide ratios at a constant NaCl concentration of 0.537M, i.e. typical of seawater. This means that as the chloride:bromide ratio decreases the amount of bromide present will increase, and therefore so will the potential yield of HOBr. Thus, at 20:1 the potential yield of HOBr is about 0.027M, while at 12:1it is about 0.045M, while at 8:1 it is about 0.067M.

FIG. 4 shows that with 20:1 chloride:bromide the HOBr at 0.025M approaches (93%) its theoretical maximum. With 12:1and 8:1 ratios the HOBr at about 78% of its theoretical maximum.

The difference in efficiency between the 12:1 and 20:1 ratios cannot be due solely to the ratios themselves, since in the FIGS. 2 and 3 experiment a high efficiency was reached with the 12:1 ratio at a high rate of electrolysis. If the shapes of the 20:1 and 12:1 curves in FIG. 4 are compared with the curves in FIG. 2, it will be seen that the 20:1 curve is similar to curve A in FIG. 2, illustrating rapid complete oxidation of bromide ion, while the 12:1 curve is similar to that of curve B, as expected. When the times taken to reach their peaks are compared, it is seen that the 20:1 curve peaks at about 90 minutes while the 12:1 curve peaks at about 170 minutes, compared with 60 minutes for curve A of FIG. 2 and 160 minutes for curve B. This suggests that the 12:1 ratio yield of FIG. 4 would be improved by increasing the rate of electrolysis so that the output resembles that of curve A in FIG. 2. However, since the 20:1 ratio gives a good % yield at the electrolysis rate used in the FIG. 4 experiment, this suggests, in turn, that the electrolysis time is also affecting the efficiency of the HOBr yield, probably owing to the occurrence of slower side reactions. To investigate this, electrolysis was carried out at a much higher rate, with different chloride:bromide ratios. 1 liter of electrolyte was recirculated through the cell giving an electrolysis rate of 2100 coulombs/liter/min. (i.e. 10 times higher than experiment A shown in FIG. 2). The concentration of chloride was 0.53M; i.e. typical of seawater. The chloride:bromide ratios were 4:1, 6:1, 8:1 and 12:1. The production of HOBr was monitored, along with HOCl and bromate ion. The results are shown in FIGS. 5 to 8.

The first point to note is that, as expected, the peak level of HOBr was reached much more quickly (between 6 and 17 minutes; or one-tenth the time shown in FIG. 2).

Secondly, the peak level of HOBr increased with higher chloride:bromide ratio, from 54% for the 4:1 solution, for the 6:1 solution, 94% for the 8:1 solution and 96% for the 12:1 solution. This compares with the 58% to 86% yields obtained in the experiment of FIG. 1 at an electrolysis rate of 84 coulombs/liter/min.

Thirdly, the increasing level of bromate ion reflects the lowered yield of HOBr, suggesting that secondary electrolytic degradation of HOBr to bromate may be responsible. Obviously, the longer the HOBr is exposed to electrolysis the more pronounced this effect will be.

Fourthly, HOCl does not appear until the peak HOBr level is reached; more specifically until all the bromide ion has been used up. Thus, the absence of HOCl in FIGS. 5 and 6 suggests that there was still unused bromide after the HOBr level had peaked, which also accounts for the lower efficiency and is indicated by the rounded peak of the HOBr curve. On the other hand, in FIGS. 7 and 8, the HOBr curve peaks sharply, close to the theoretical maximum, and HOCl then appears immediately. Moreover, as the chloride:bromide ratio is increased (8:1 to 12:1) the HOCl level rises very quickly and compares with the HOBr level.

The foregoing experimental results would seem to indicate that chloride:bromide ratios considerably higher than 4:1 are appropriate for efficient utilisation of bromide, but the optimum ratio depends also on the rate and period of electrolysis. Thus, for a seawater-based electrolyte, at 210 coulombs/liter/min., a ratio in excess of 12:1 may be needed to give a 90% theoretical yield of HOBr in about 60 minutes, while at 2100 coulombs/liter/min. 90% yield may be achieved at around 7:1 ratio in about 6 or 7 minutes.

Figure 7:
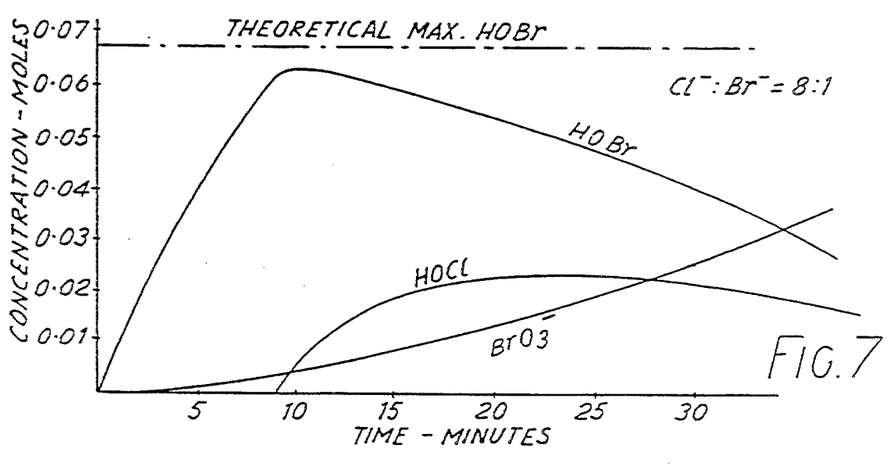
Figure 8:
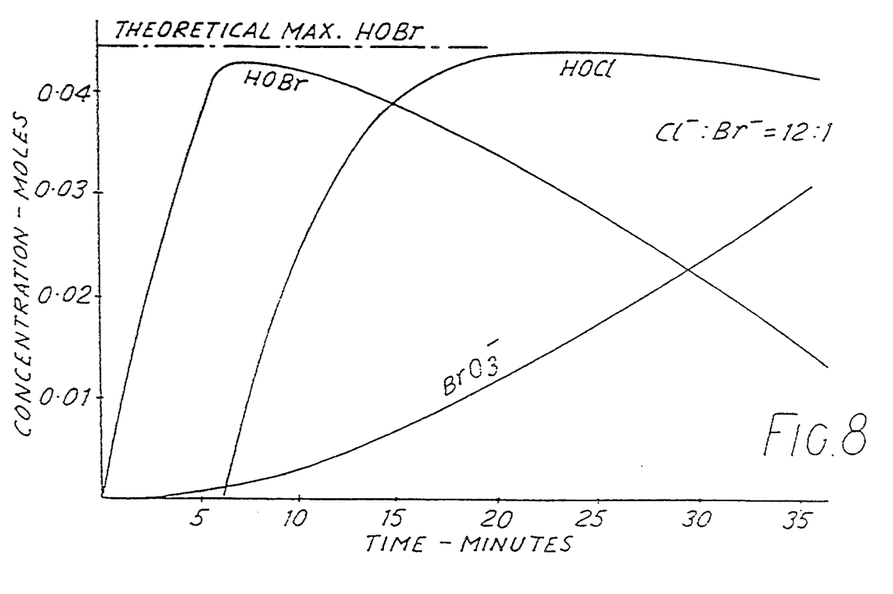

However, apart from the efficient utilisation of bromide, other factors may come into the consideration, particularly the generation of HOCl. In order to avoid or minimise the level of HOCl in the product, it will be necessary either to accept a lower efficiency of HOBr generation (see e.g. FIG. 6), or else control the electrolysis so that it ceases as close as possible to the peak HOBr level (see e.g. FIGS. 7 and 8). Good equipment will therefore either monitor the HOBr and/or HOCl levels, or it will be arranged to operate to predetermined parameters (e.g. current, time, volume, electrolyte concentration) so as to shut off the electrolysis at the optimum point. A comparison of FIGS. 7 and 8 shows that the higher the chloride:bromide ratio, the more critical will be the effect on HOCl concentration of going significantly past the peak HOBr level, and the more critical will be the effect on HOBr concentration of falling significantly short of the peak HOBr level. Thus, for that configuration, a chloride:bromide ratio of 7 or 8:1 would probably be chosen, with the electrolysis time controlled within ±1 minute, preferably ±½ minute, of the predicted maximum level of HOBr. If the equipment were configured to operate at the much lower electrolysis rate of 210 coulombs/liter/min. (see FIGS. 1 and 2) a chloride:bromide ratio of 10 or 12:1, or possibly as low as 8:1, would probably be chosen, with the electrolysis time controlled within about ±5 minutes of the predicted maximum.

The processes of the invention can be carried out in various ways, as indicated earlier. One embodiment of apparatus is shown diagrammatically in FIG. 9.

Figure 9:
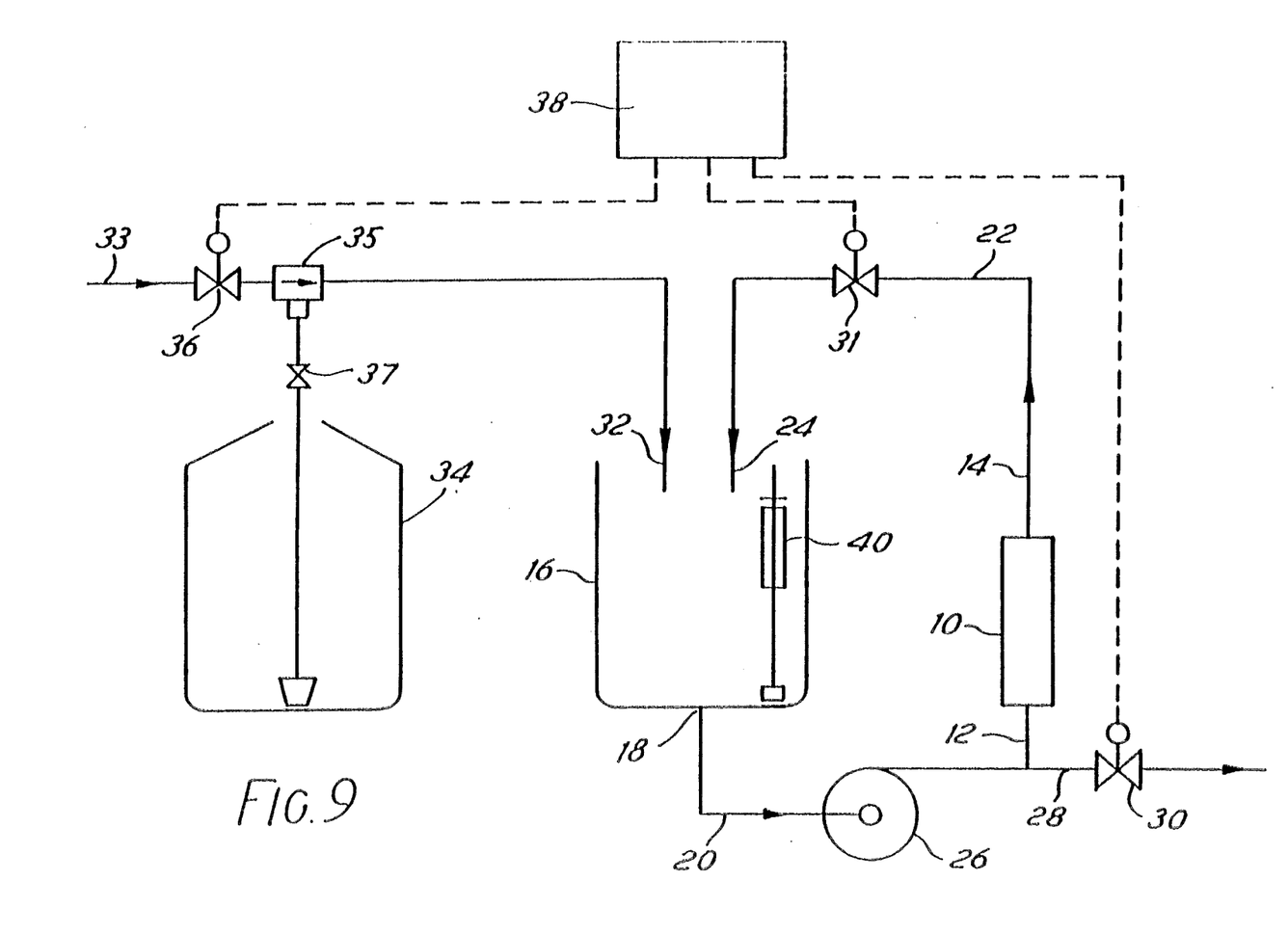
FIG. 9 shows diagrammatically apparatus for use in carrying out the process of the invention.

The apparatus comprises an electrolysis cell 10 (e.g. Cogen EC 400) having an inlet 12 and outlet 14 for solution. A tank 16 provides a reservoir for solution, and has an outlet 18 connected by a conduit 20 to the inlet 12 of the cell, while the outlet 14 of the cell is connected by a conduit 22 to an inlet 24 of the tank 16. A pump 26 is provided in the conduit 20 so as to establish a circulation of solution between the tank and cell. A discharge outlet 28 is provided in the conduit 20 between the pump and the cell, and is controlled by a valve 30 to allow solution to be discharged to the system containing the water to be treated. Suitably, a valve 31 is provided in the conduit 22 to shut off the return flow to the tank 16 during discharge through the valve 30. If desired, the valves 30 and 31 could be combined into a two-way valve at the junction between the outlet 28 and the conduit 20.

A replenishing inlet 32 in the tank supplies replenishing solution containing chloride and bromide ions. This is suitably provided by passing a supply 33 of water through an eductor device 35 to the inlet 32, the eductor device being connected to a reservoir 34 containing a relatively concentrated solution of chloride and bromide ions, suitably sodium chloride and sodium bromide. An adjustable valve 37 in the conduit to the eductor controls the proportion of chloride/bromide solution picked up by the water from the supply 33 as it passes through the eductor, and therefore determines the overall concentration of chloride/bromide in the solution entering the reservoir 16, and therefore the concentration of hypobromite in the solution discharged to the water system. The water from the supply 33 is controlled by a valve 36, and the whole system is suitably operated by electrical control means which includes a liquid level sensor 40 within the tank 16.

The operation of the apparatus is as follows. Initially the valve 36 is opened and water from the supply 33 passes through the eductor 35, picking up a predetermined proportion of chloride/bromide solution, and enters the tank 16. When the solution in the tank reaches a predetermined level as determined by the sensor 40, the control means 38 operates to close the valve 36, open valve 31 (if it is not already open), start the pump 26, and switch on the current in the cell about two minutes later. This establishes circulation of the solution between the cell and the tank 16, and the cell operates to produce hypobromite in the solution. The concentration of chloride and bromide ions is selected so as to provide the desired level of biocidal treatment, but typically the concentration of sodium bromide in the solution being circulated may be about 2 to 2½% by weight.

When the condition has been reached that substantially all the bromide ions have been converted, but before any substantial level of HOCl appears, the control means 38 operates to open valve 30 and close valve 31, so that the HOBr solution from the circuit is discharged to the water system to be treated. The point at which the valves 30 and 31 are operated in this fashion can be a predetermined period after electrolysis treatment has commenced (according to the criteria discussed earlier), or it could be in response to detection of substantially complete conversion of bromide ions, peak concentration of HOBr and/or detection of HOCl in the solution. The valve 30 can remain open until all the liquid has been discharged from the circuit, but preferably a minimal amount is left in, for example to avoid allowing the pump to run dry, and this can be determined by the level sensor 40 detecting a minimum level in the tank 16, whereat the control means 38 closes the valve 30. The valve 31 can be reopened at the same time, or it can be opened later when the circuit is next operated.

The foregoing sequence of operations can be repeated as desired, for example at predetermined intervals, or in response to a signal reaching the control means 38 indicating that treatment is required.

I claim:

1. A process for producing hypobromous acid by electrolyzing a solution containing both chloride and bromide ions, characterized in that (i) the molar ratio of chloride:bromide ions initially is greater than 4:1 and less than 120:1; and
   (ii) said molar ratio, the rate of electrolysis and the period of electrolysis are selected so as to result in a yield of hypobromous acid of at least 75% of the theoretical yield, based on the initial concentration of bromide ion.

2. A process according to claim 1 wherein the yield of HOBr is at least 80% of the theoretical yield.

3. A process according to claim 1 wherein the yield of HOBr is at least 90% of the theoretical yield.

4. A process according to any one of claims 1, 2 and 3 wherein the electrolysis is terminated before the molar concentration of HOCl exceeds 20% of the molar concentration of HOBr.

5. A process according to claim 1 wherein the process is terminated before the molar concentration of HOCl exceeds 10% of the molar concentration of HOBr.

6. A process according to claim 1 wherein the process is terminated before the molar concentration of HOCl exceeds 5% of the molar concentration of HOBr.

7. A process according to claim 1 wherein seawater is used as a source of chloride ions.

8. A process according to claim 1 which comprises passing the electrolyte once through an electrolytic cell or bank of cells, the rate and period of electrolysis being determined by the electric current density and the rate of flow.

9. A process according to claim 1 which comprises recirculating a volume of electrolyte through an electrolytic cell.

10. A process according to claim 9 wherein the electrolyte is passed around a circuit comprising a reservoir having an inlet fop introducing the chloride/bromide solution, an outlet leading to the electrolytic cell inlet, a conduit returning treated solution from the cell to the reservoir, and a pump for maintaining circulation.

11. A process according to claim 10 wherein after electrolysis the HOBr solution is discharged from a point in the circuit downstream from the pump, whereby the HOBr solution is pumped from the reservoir to a receiving system.

12. A process according to claim 9, 10 or 11 wherein after electrolysis the HOBr solution is discharged to a receiving system, and the procedure is repeated as often as required to maintain an adequate level of HOBr in the receiving system.

13. Apparatus for producing a solution containing a biocidal concentration of hypobromous acid by electrolyzing a solution containing both chloride and bromide ions, said apparatus having a circuit comprising:
   a) an electrolysis cell,
   b) a reservoir container,
   c) conduit means connecting said cell and said reservoir container so that said solution containing both chloride and bromide ions can be circulated between said reservoir and said cell,
   d) pump means for effecting said circulation,
   e) discharge means for withdrawing said solution containing a biocidal concentration of hypobromous acid from said circuit,
   f) replenishment means for introducing replenishing solution containing both chloride and bromide ions into said circuit, and
   g) control means arranged so as to supply a predetermined volume of chloride/bromide solution to the reservoir, to operate the pump so as to circulate the solution between the reservoir and the electrolytic cell, and to discharge the solution from the circuit either (i) after a set period to provide said hypobromous acid solution, or (ii) when it has detected one or more of the following events:

1) all the bromide ions have been converted to hypobromite ions,
2) the HOBr level is at a peak,
3) HOCl has appeared in the solution; such as to provide said hypobromous solution.

* * * * *

UNITED STATES PATENT AND TRADEMARK OFFICE
CERTIFICATE OF CORRECTION

PATENT NO. : 5,429,723

DATED : July 4, 1995

INVENTOR(S) : Atkinson

It is certified that error appears in the above-indentified patent and that said Letters Patent is hereby corrected as shown below:

On the cover sheet, under Foreign Application Priority Data [30], delete "8813954" and insert therefor --8813954.8--.

Column 3, line 4, delete "coolant in" and insert therefor --coolant. In--.

Column 4, line 50, delete "NaBP" and insert therefor --NaBr--.

Column 4, line 55, immediately preceding "liter" insert --50--.

Column 5, line 19, delete "12:1it" and insert therefor --12:1 it--.

Column 5, line 62, immediately following "solution," insert --82%--.

Column 7, line 21, immediately following "control means" insert --38--.

Claim 4, column 8, lines 12-13, delete "any one of claims 1, 2 and 3" and insert therefor --claim 1--.

UNITED STATES PATENT AND TRADEMARK OFFICE
CERTIFICATE OF CORRECTION

PATENT NO. : 5,429,723
DATED : July 4, 1995
INVENTOR(S) : Atkinson

It is certified that error appears in the above-indentified patent and that said Letters Patent is hereby corrected as shown below:

Claim 13, column 8, line 65, delete "predetermined" and insert therefor --set--.

Claim 13, column 10, line 4, delete "such as".

Signed and Sealed this

Third Day of December, 1996

*Attest:*

BRUCE LEHMAN

*Attesting Officer*   Commissioner of Patents and Trademarks